(12) United States Patent
Laws et al.

(10) Patent No.: US 9,971,865 B2
(45) Date of Patent: May 15, 2018

(54) METHOD FOR OPERATING A HYBRID VEHICLE

(75) Inventors: Larry D. Laws, Macomb, MI (US); John P. Blanchard, Holly, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 1693 days.

(21) Appl. No.: 12/714,966

(22) Filed: Mar. 1, 2010

(65) Prior Publication Data

US 2011/0213517 A1   Sep. 1, 2011

(51) Int. Cl.
| | |
|---|---|
| B60W 20/00 | (2016.01) |
| F16H 59/66 | (2006.01) |
| G06F 19/00 | (2018.01) |
| B60W 40/06 | (2012.01) |
| B60L 11/18 | (2006.01) |
| B60W 50/04 | (2006.01) |
| B60W 10/26 | (2006.01) |

(52) U.S. Cl.
CPC .......... *G06F 19/00* (2013.01); *B60L 11/1861* (2013.01); *B60W 10/26* (2013.01); *B60W 40/06* (2013.01); *B60W 50/04* (2013.01); *B60W 20/00* (2013.01); *B60W 2510/244* (2013.01); *B60W 2550/142* (2013.01); *B60W 2550/143* (2013.01)

(58) Field of Classification Search
None
See application file for complete search history.

(56) References Cited

U.S. PATENT DOCUMENTS

| | | | | |
|---|---|---|---|---|
| 6,487,477 | B1 * | 11/2002 | Woestman et al. | 701/22 |
| 8,204,660 | B2 * | 6/2012 | Nakai | B60W 30/18027 701/65 |
| 2005/0080523 | A1 * | 4/2005 | Bennett | B60K 6/445 701/22 |
| 2007/0145918 | A1 * | 6/2007 | Kumar | B60K 6/28 318/139 |
| 2009/0164081 | A1 * | 6/2009 | Meloche et al. | 701/94 |
| 2009/0212626 | A1 * | 8/2009 | Snyder et al. | 307/10.1 |
| 2010/0106351 | A1 * | 4/2010 | Hanssen et al. | 701/22 |
| 2010/0286857 | A1 * | 11/2010 | Otake | 701/22 |
| 2011/0251747 | A1 * | 10/2011 | Imai et al. | 701/22 |

* cited by examiner

*Primary Examiner* — Ariel J Yu
(74) *Attorney, Agent, or Firm* — Reising Ethington, P.C.

(57) ABSTRACT

A method that may be used to operate a hybrid vehicle in a mountainous or other environment where roads have significant grades or inclines. In this kind of setting, standard methods for managing power within the hybrid vehicle may be insufficient when driving the hybrid vehicle up and down substantial inclines and declines; this can be particularly true if the driver attempts to maintain the hybrid vehicle at higher speeds. Thus, this method may use a power management scheme that is specifically adapted to address this kind of situation and can adjust or change target values accordingly, such as those that pertain to a state-of-charge (SOC) for the hybrid vehicle battery.

17 Claims, 3 Drawing Sheets

METHOD FOR OPERATING A HYBRID VEHICLE

TECHNICAL FIELD

The present invention generally relates to a hybrid vehicle and, more particularly, to a method for operating a hybrid vehicle in a mountainous or other environment where roads have significant grades or inclines.

BACKGROUND

Some hybrid vehicles use a primary power source for the majority of the vehicle's propulsion needs and supplement that with an auxiliary power source, as needed. Certain driving conditions, such as the steep inclines and declines sometimes found on mountain roads, can present unique challenges for hybrid vehicles.

For example, when a hybrid vehicle is attempting to climb a mountain road with a significant grade, the electric motor may exhaust or at least diminish much of the stored charge on the battery. If the state-of-charge (SOC) of the battery falls beneath a certain threshold, the hybrid vehicle may have to rely on an internal combustion engine to provide supplemental propulsion power. In order to accomplish this task without resulting in a significant reduction in power that is noticeable to the driver, the operational interaction between the electric motor and the internal combustion engine may need to be specifically tailored to environments such as these.

SUMMARY

According to one embodiment, there is provided a method for operating a hybrid vehicle having a primary power source and an auxiliary power source. The method may comprise the steps of: (a) determining if the hybrid vehicle enters a steep grade environment; (b) if the hybrid vehicle enters the steep grade environment, then making a first set of adjustments to a power management scheme that controls one or more aspects of the primary power source and/or the auxiliary power source; and (c) operating the hybrid vehicle according to the power management scheme with the first set of adjustments.

According to another embodiment, there is provided a method for operating a hybrid vehicle having a primary power source and an auxiliary power source. The method may comprise the steps of: (a) determining if the hybrid vehicle enters a steep grade environment; (b) if the hybrid vehicle enters the steep grade environment, then increasing a target value for a battery that is part of the primary power source; and (c) using the auxiliary power source to charge the battery to the increased target value.

BRIEF DESCRIPTION OF THE DRAWINGS

Preferred exemplary embodiments will hereinafter be described in conjunction with the appended drawings, wherein like designations denote like elements, and wherein.

DETAILED DESCRIPTION OF THE EMBODIMENTS

The method described herein may be used to operate a hybrid vehicle in a mountainous or other environment where roads have significant grades or inclines. In this kind of setting, standard methods for managing power within the hybrid vehicle may be insufficient when driving the hybrid vehicle up and down substantial inclines and declines; this can be particularly true if the driver attempts to maintain the hybrid vehicle at higher speeds. Thus, the method described below uses a power management scheme that is specifically adapted to address this kind of situation.

A "hybrid vehicle," as used herein, broadly includes any vehicle that has two or more sources of power that can be used for purposes of vehicle propulsion. Some examples of suitable hybrid vehicles include, but are certainly not limited to, hybrid electric vehicles (HEVs), plug-in hybrid electric vehicles (PHEVs), extended-range electric vehicles (EREVs), two-mode hybrids, full hybrids, power-assist hybrids, mild hybrids, series hybrids, parallel hybrids, series-parallel hybrids, power-split hybrids, BAS or BAS-plus hybrids, hydraulic hybrids, pneumatic hybrids, or any other type of hybrid vehicle. This includes passenger cars, cross-over vehicles, sports-utility vehicles, recreational vehicles, trucks, buses, commercial vehicles, etc. Although the following description is provided in the context of an exemplary plug-in hybrid electric vehicle (PHEV) with a range-extending series hybrid configuration, it should be appreciated that the present method may be used with any hybrid vehicle and is not limited to any particular type.

Figure 1:
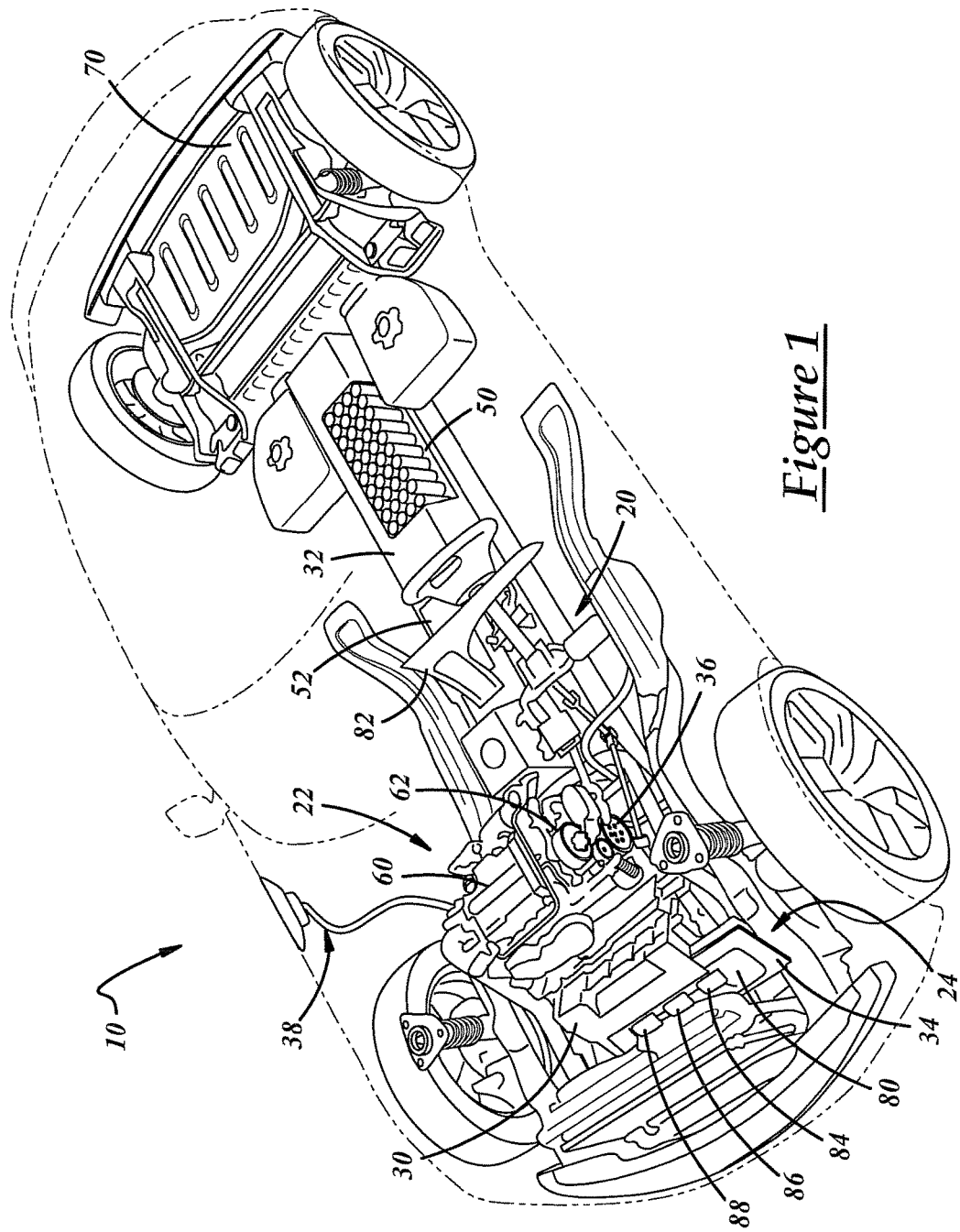
FIG. 1 is a perspective view depicting portions of an exemplary hybrid vehicle.

With reference to FIG. 1, there is shown a schematic view of an exemplary plug-in hybrid electric vehicle (PHEV) 10 having a range-extending series hybrid configuration where a high voltage battery drives an electric motor for vehicle propulsion, and an internal combustion engine drives a generator for producing electrical energy. According to this exemplary embodiment, hybrid vehicle 10 includes a primary power source 20, an auxiliary power source 22, and a control system 24. Because many of the components of hybrid vehicle 10 are generally known in the art and because many different components and arrangements may be used with the present method, a brief explanation is provided here in lieu of a detailed recitation of their individual structure and functionality.

Primary power source 20 is largely responsible for vehicle propulsion and, according to this particular embodiment, includes a charger 30, a battery 32, an inverter/converter 34, and one or more electric motor(s) 36. In general, battery charger 30 may receive electrical energy from one or more sources, convert and/or condition the electrical energy so that it is in a suitable form for battery 32, and provide the converted electrical energy to the battery where it is stored. During vehicle propulsion, battery 32 provides electrical energy to inverter/converter 34 where it is again converted, this time into a form suitable for electric motor 36, and provided to the electric motor for driving the wheels of the vehicle. During regenerative braking, electric motor 36 may act as a generator and provide electrical energy to battery 32 via inverter/converter 34.

Charger 30 may receive electrical energy from a variety of sources, including external power sources (e.g., a standard AC electrical outlet, a remote charging station, an external generator, etc.) and internal power sources (e.g., an onboard generator). In the case of an external power source, charger 30 receives electrical energy through a suitable power coupling or charging cord 38 that connects the external power source to the charger. Skilled artisans will appreciate that charger 30 may be provided according to any number of different embodiments, may be connected in any number of different configurations, and may include any number of different components, such as transformers, rectifiers, switching power supplies, filtering means, cooling means, sensors, control units and/or any other suitable components known in the art.

Battery 32 may store electrical energy that is used to drive electric motor(s) 36, as well as to meet other electrical needs of the hybrid vehicle. According to an exemplary embodiment, battery 32 includes a high-voltage battery pack 50 (e.g., 40V-600V) and a sensor unit 52. Battery pack 50 includes a number of individual battery cells and may utilize any suitable battery chemistry, including those that are based on the following technologies: lithium ion, nickel metal hydride (NiMH), nickel cadmium (NiCd), sodium nickel chloride (NaNiCl), or some other battery technology. Battery 32 should be designed to withstand repeated charge and discharge cycles and may be used in conjunction with other energy storage devices, such as capacitors, super capacitors, inductors, etc. Those skilled in the art will appreciate that battery 32 may be provided according to any number of different embodiments, may be connected in any number of different configurations, and may include any number of different components, like sensors, control units and/or any other suitable components known in the art.

Inverter/converter 34 may act as an intermediary between battery 32 and electric motor(s) 36, as these devices are often times designed to function according to different operational parameters. For example, during vehicle propulsion inverter/converter 34 can step-up the voltage from battery 32 and convert the current from DC to AC in order to drive electric motor(s) 36, while during regenerative braking the inverter/converter may step-down the voltage generated by a braking event and convert the current from AC to DC so that it can be properly stored by the battery. In a sense, inverter/converter 34 manages how these different operational parameters (i.e., AC versus DC, various voltage levels, etc.) work together. Inverter/converter 34 may include an inverter for DC to AC conversion, a rectifier for AC to DC conversion, a step-up converter or transformer for increasing the voltage, a step-down converter or transformer for decreasing the voltage, other suitable energy management components, or some combination thereof. In the exemplary embodiment shown, inverter and converter units are integrated into a single bi-directional device, however, other embodiments are certainly possible. It should be realized that inverter/converter 34 may be provided according to any number of different embodiments (e.g., with separate inverter and converter units, bi-directional or uni-directional, etc.), may be connected in any number of different configurations, and may include any number of different components, like cooling systems, sensors, control units and/or any other suitable components known in the art.

Electric motor(s) 36 may use electrical energy stored in battery 32 and/or provided by auxiliary power source 22 to drive the vehicle wheels, which in turn propels the hybrid vehicle. While FIG. 1 schematically depicts electric motor 36 as a single discrete device, the electric motor may be combined with a generator (a so-called "mogen") or it may include multiple electric motors (e.g., separate motors for the front and rear wheels, separate motors for each wheel, separate motors for different functions, etc.), to cite a few possibilities. Thus, the following description only refers to a single electric motor 36 even though more than one electric motor may be used by the hybrid vehicle. Primary power source 20 is not limited to any one particular type of electric motor, as many different motor types, sizes, technologies, etc. may be used. In one example, electric motor 36 includes an AC motor (e.g., a three-phase AC induction motor, etc.) as well as a generator that can be used during regenerative braking. Electric motor 36 may be provided according to any number of different embodiments (e.g., AC or DC motors, brushed or brushless motors, permanent magnet motors, etc.), may be connected in any number of different configurations, and may include any number of different components, like cooling features, sensors, control units and/or any other suitable components known in the art.

Auxiliary power source 22 may provide power in the event that battery 32 is depleted and, according to this particular embodiment, includes an engine 60 and a generator 62. In general, engine 60 turns generator 62, which in turn creates electrical energy that may be used to recharge battery 32, to drive electric motor 36 or other electrical devices in the hybrid vehicle, or to do both. The specific allocation of electrical energy from generator 62 may be influenced by the state of the battery (e.g., does the battery have a low state-of-charge (SOC), etc.), by performance demands on the motor (e.g., is the driver trying to accelerate the vehicle), etc. In another embodiment, engine 60 is replaced with a fuel cell, a hydraulic or pneumatic system, or some other alternative energy supply that is capable of providing electrical energy to the hybrid vehicle.

Engine 60 may drive generator 62 using conventional internal combustion techniques, and may include any suitable type of engine known in the art. Some examples of suitable engines include gasoline, diesel, ethanol, flex-fuel, naturally aspirated, turbo-charged, super-charged, rotary, Otto-cycle, Atkins-cycle and Miller-cycle engines, as well as any other suitable engine type known in the art. According to the specific embodiment shown here, engine 60 is a small fuel-efficient engine (e.g., a small displacement, turbo-charged four-cylinder engine) that receives fuel from fuel tank 70 and uses the mechanical output of the engine to turn generator 62. Skilled artisans will appreciate that engine 60 may be provided according to any number of different embodiments, may be connected in any number of different configurations (e.g., engine 60 could be part of a parallel hybrid system where the engine is also mechanically coupled to the vehicle wheels instead of exclusively being used to generate electricity), and may include any number of different components, like sensors, control units and/or any other suitable components known in the art.

Generator 62 is mechanically coupled to engine 60 so that the mechanical output of the engine causes the generator to create electrical energy that may be provided to battery 32, electric motor 36, or both. As with all of the exemplary components described herein, generator 62 may include one of any number of suitable generators known in the art and is certainly not limited to any particular type. It is worth noting that generator 62 may be provided according to any number of different embodiments (e.g., the generator of motor 36 and generator 62 may be combined into a single unit), may be connected in any number of different configurations, and may include any number of different components, like cooling units, sensors, control units and/or any other suitable components known in the art. Again, the preceding description of exemplary hybrid vehicle 10 and the illustration in FIG. 1 are only intended to illustrate one potential hybrid arrangement and to do so in a general way. Any number of other hybrid arrangements and architectures, including those that differ significantly from the one shown in FIG. 1, may be used instead.

Control system 24 may be used to control, govern or otherwise manage certain operations or functions of hybrid vehicle 10 and, according to one exemplary embodiment, includes a hybrid control unit 80 and a user interface 82. Hybrid control unit 80 may use stored algorithms or other electronic instructions to manage the activities of the various components and devices of both the primary power source 20 and the auxiliary power source 22 so that these two systems can seamlessly interact with one another and can react to a variety of changing conditions. Depending on the particular embodiment, hybrid control unit 80 may be a stand-alone electronic module (e.g., a vehicle integrated control module (VICM), a traction power inverter module (TPIM), a battery power inverter module (BPIM), etc.), it may be incorporated or included within another electronic module in the vehicle (e.g., a power train control module, an engine control module, etc.), or it may be part of a larger network or system (e.g., a battery management system (BMS), a vehicle energy management system, etc.), to name a few possibilities. According to this particular embodiment, hybrid control unit 80 is at least partially responsible for performing certain aspects of the power management scheme described below.

Moreover, hybrid control unit 80 may include any combination of electronic processing devices 84, memory devices 86, input/output (I/O) devices 88, and/or other known components, and may perform various control and/or communication related functions. Processing device 84 may include any type of suitable electronic processor (e.g., a microprocessor, a microcontroller, an application specific integrated circuit (ASIC), etc.) that executes instructions for software, firmware, programs, algorithms, scripts, etc. This processor is not limited to any one type of component or device. Memory device 86 may include any type of suitable electronic memory means and may store a variety of data and information. This includes, for example: sensed vehicle conditions; look-up tables and other data structures; software, firmware, programs, algorithms, scripts, and other electronic instructions; component characteristics and background information, etc. The present method including certain aspects of the power management scheme—as well as any other electronic instructions and/or information needed for such tasks—may also be stored or otherwise maintained in memory device 86. Hybrid control unit 80 may be electronically connected to other vehicle devices and modules via I/O device 88 and suitable connections, like a communications bus, so that they can interact as required. These are, of course, only some of the possible arrangements, functions and capabilities of hybrid control unit 80, as others are certainly possible.

User interface 82 may be used to exchange information between a vehicle user and the vehicle, and may do so in a variety of ways. For instance, user interface 82 may receive user requests, instructions and/or other input from a vehicle user via: a touch-screen display, a pushbutton or other vehicle control, a keyboard, a microphone (e.g., cases where input is verbally provided and interpreted by a human-machine interface (HMI)), or a wireless communication module (e.g., cases where input is wirelessly provided from a mobile communications device, laptop, desktop, website, backend facility, etc.), to cite a few examples. In addition, user interface 82 may be used to provide vehicle status, reports and/or other output to the vehicle user. The same devices and techniques for providing input, as well as others like a vehicle audio system and instrument panel, may also be used to provide output. Other user interfaces may be provided instead, as the exemplary ones shown and described herein represent only some of the possibilities. The present method may utilize any user interface to exchange information with the vehicle and is not limited to any particular type.

The exemplary hybrid vehicle 10 may include more, less or a different combination of elements, components, devices and/or modules than those illustrated and described here, as the present method is not limited to this particular embodiment. For example, hybrid vehicle 10 may include parts such as: a hybrid transmission, a power-split device, a gear box, one or more clutches, a flywheel and/or other hybrid drivetrain components; a low-voltage electrical circuit or bus (e.g., standard 12V, 18V or 42V circuits), an accessory power module (APM), electronic accessories, different electronic modules, a telematics unit, additional electric motors and/or other electronic devices; as well as any other devices that may be found on hybrid vehicles. The components, devices and/or modules shown in FIG. 1 may be integrated or otherwise combined with other parts of the hybrid vehicle, as the illustration in that figure is only meant to generally and schematically illustrate one potential hybrid system arrangement.

Figure 2:
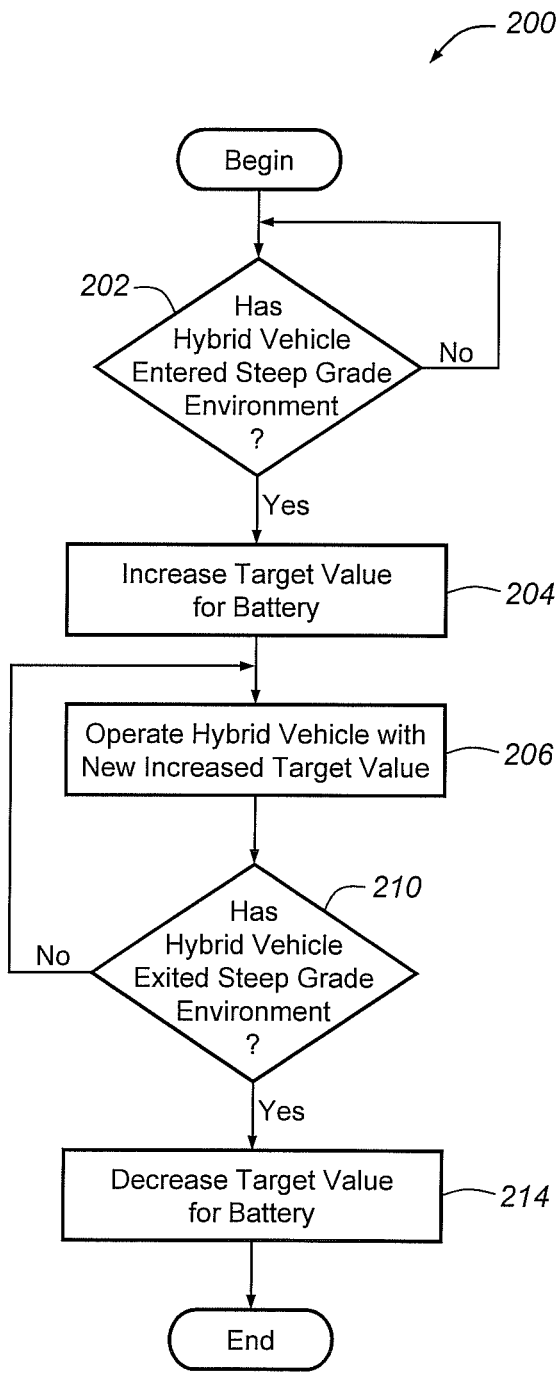
FIG. 2 is a flowchart illustrating certain steps of an exemplary method that may be used to operate a hybrid vehicle, such as the exemplary one shown in FIG. 1.

Turning now to FIG. 2, an exemplary method 200 is provided for operating a hybrid vehicle in a mountainous or other environment where roads have significant grades or inclines. It is sometimes difficult for a hybrid vehicle to maintain higher vehicle speeds when it is climbing a steep road with a severe incline or grade (e.g., roads with grades over 3%). Consider the example where hybrid vehicle 10 is driving on a section of mountain road with an incline that ranges between 3%-10% for a considerable distance. In order to maintain a desired vehicle speed on such a steep section, electric motor 36 may have to draw so much electrical energy from battery 32 that the state-of-charge (SOC) of the battery rapidly declines; this can even be the case when engine 60 is running and is providing electrical energy to the hybrid vehicle. If no remedial actions are taken and the SOC of battery 32 continues to fall and dips below some minimum threshold (e.g., 15%), then hybrid vehicle 10 may have to slow down or even stop in order for engine 60 to replenish some of the electrical energy. Needless to say, the driver may consider such an action undesirable. Method 200 takes certain precautionary measures regarding the generation, storage and/or usage of electrical energy so that this situation can be avoided or at least minimized.

Beginning with step 202, the method first monitors one or more parameter(s) and uses these parameters to determine if the hybrid vehicle has entered or exited a steep grade environment. A "steep grade environment," as used herein, broadly includes any section of road or highway where the average grade is steep enough to warrant a specific power management scheme for the hybrid vehicle; although steep grade environments are not specifically limited to any certain grade or range of grades, they are oftentimes found on mountain roads where the average grade is greater than about 5% for some distance. Step 202 may detect steep grade environments in many different ways using a variety of techniques, including ones where the method compares parameters pertaining to primary power source 20 with those pertaining to the overall performance of hybrid vehicle 10. By comparing how hard primary power source 20 is working (e.g., the output of electric motor 36) with the effect that such work has on the performance of the vehicle (e.g., vehicle acceleration), step 202 is able to gain some insight into whether or not the hybrid vehicle is in a steep grade environment where the slope of the road is substantial. For example, if electric motor 36 is using 40 KW of power yet hybrid vehicle 10 is not accelerating at all, then step 202 may determine that the hybrid vehicle is on a road with a significant incline and is thus in a steep grade environment.

Skilled artisans will appreciate that there are a number of different ways to acquire the information needed for step 202. For instance, this step may use one or more parameters that pertain to primary power source 20, such as a speed, torque and/or power measurement for electric motor 36 or some component mechanically coupled to the electric motor (e.g., output shafts, transmission parts, axles, vehicle wheels, etc.), or a battery condition (e.g., battery SOC, voltage, current, etc.). Essentially, any type of measurement, reading or parameter could be used that pertains or relates to the operational status or condition of primary power source 20. To illustrate, consider the example where step 202 monitors the torque produced by electric motor 36 or exhibited at some other downstream component. The torque reading provides an indication of how hard primary power source 20 is working and may be used to determine if hybrid vehicle 10 is in a steep grade environment. In another example, step 202 monitors the SOC or some other battery condition in order to glean some insight into how hard primary power source 20 is working; a significant decrease in SOC, for instance, may suggest that hybrid vehicle 10 is in a steep grade environment. Parameters such as these may be gathered from sensors or other devices located throughout the hybrid vehicle and may be provided in a variety of forms.

Step 202 may also use one or more parameters that pertain to the performance of hybrid vehicle 10, such as vehicle position, velocity and/or acceleration. These 'vehicle performance parameters' may be used in conjunction with the 'primary power source parameters' described above when determining if hybrid vehicle 10 is in a steep grade environment. Skilled artisans understand that a vehicle's position, velocity and acceleration are all related; thus, any combination of these and/or other parameters pertaining to the overall performance or output of the hybrid vehicle may be used in step 202. This type of information may be gathered from an engine control module (ECM), a stability control system, or some other suitable source. As mentioned above, step 202 may obtain data or information from any number of different sources and is not limited to the examples cited herein. This includes, for example, receiving information from an inclination sensor, gyroscope, GPS device or some other component and using such information to determine if hybrid vehicle 10 is in a steep grade environment.

Figure 3:
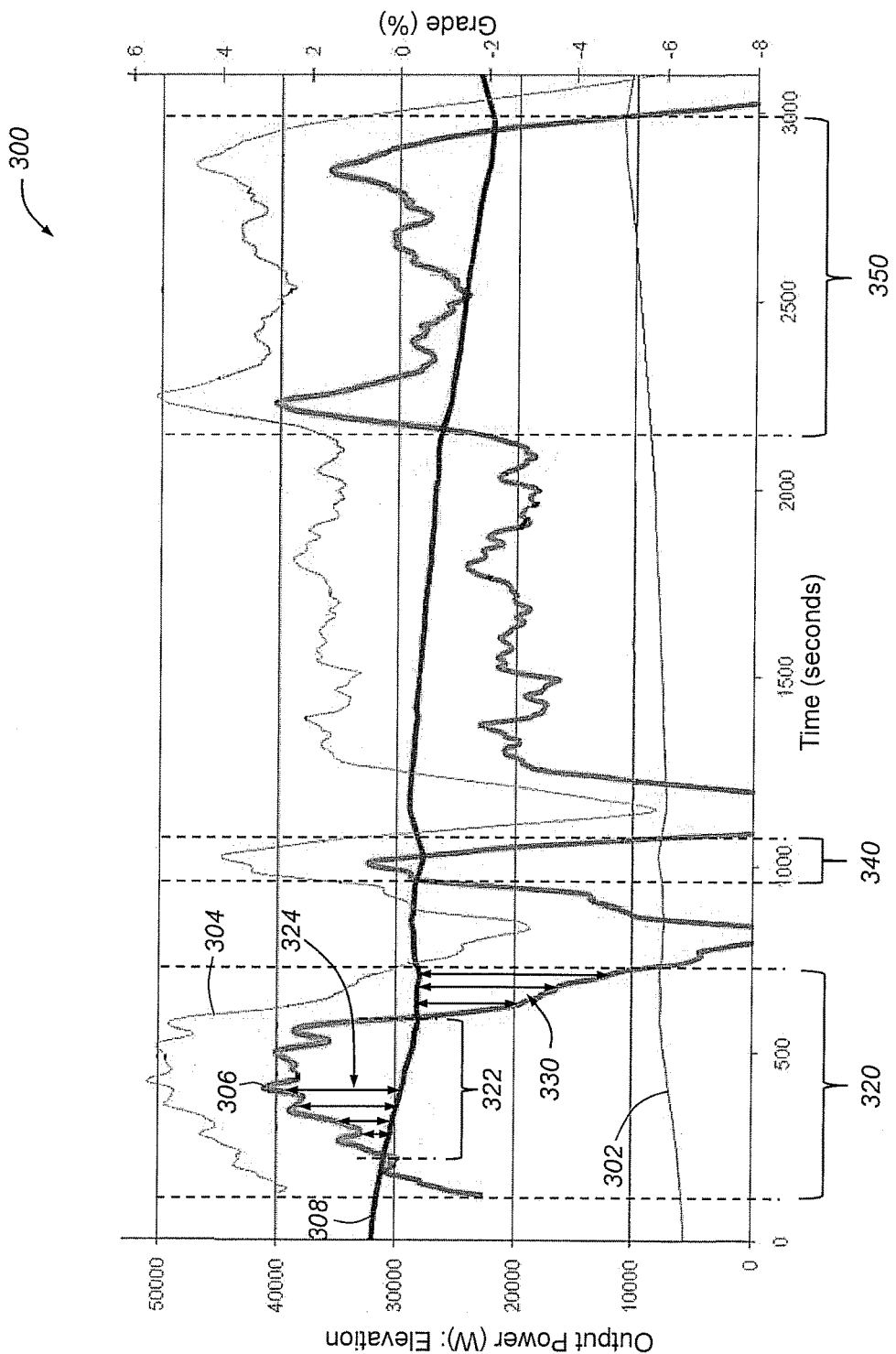
FIG. 3 is a chart showing several exemplary graphs that are provided to help illustrate the exemplary method of FIG. 2.

FIG. 3 includes a chart 300 illustrating an exemplary road segment and how method 200 may handle such a road segment. Chart 300 includes a first graph 302 that shows the elevation of the road (driving time is on the X-axis and elevation (ft) is on the left side of the Y-axis), a second graph 304 that shows the grade or slope of the road (driving time is on the X-axis and grade is on the right side of the Y-axis), a third graph 306 that shows the output power of electric motor 36 that is required in order to maintain a vehicle speed of 60 m.p.h. (driving time is on the X-axis and Electrical Power (W) is on the left side of the Y-axis), and a fourth graph 308 that shows the output power produced by auxiliary power source 22 when engine 60 is operating at a constant 4,200 r.p.m. (driving time is on the X-axis and Electrical Power (W) is on the left side of the Y-axis).

Skilled artisans will appreciate that the output power produced by an auxiliary power source (e.g., engine 60 and generator 62) can vary according to factors associated with elevation (e.g., air pressure, oxygen content, etc.); this explains why graph 308 is not entirely flat. During a first road segment or section 320, graphs 302 and 304 demonstrate that the hybrid vehicle is going uphill; graph 302 shows that the elevation is increasing, and graph 304 shows that the grade or slope is a positive one (i.e., >0%).

According to this particular embodiment, step 202 looks first at the output power of electric motor 36 (graph 304) over a certain distance (e.g., 2 miles) and determines if this output power is greater than a minimum threshold (e.g., 40 KW). Graph 304 is above the 40 KW mark for most of first road segment 320. Then step 202 looks to see if the vehicle speed and/or acceleration is less than some maximum threshold (e.g., 0.1 m/s$^2$). In this particular case, the vehicle speed is being maintained at 60 m.p.h., thus, the vehicle acceleration is 0.0 m/s$^2$. Generally speaking, step 202 is looking for situations where the electric motor is working hard, yet the vehicle acceleration is not responding in kind. Step 202 may use absolute thresholds (e.g., an absolute minimum threshold of 40 KW), it may use relative thresholds (e.g., a relative minimum threshold that is related to some other value), it may use static thresholds (e.g., ones that are constant throughout vehicle operation), or it may use dynamic thresholds (e.g., ones that change with different driving or vehicle conditions), to cite a few possibilities. By averaging or otherwise filtering this information over a certain distance or time (2 miles in this example), step 202 may avoid inadvertently making changes to the power management scheme in cases of small rolling hills, irregular acceleration by the driver, or in other unwarranted situations. The precise readings, measurements, thresholds, filtering parameters, etc. will generally be determined based on the particular hybrid vehicle in question and by the objectives of the power management scheme; some schemes are designed for maximum battery life while others are designed for optimum performance, for example. If hybrid vehicle 10 has not entered a steep grade environment, then the method simply loops back to step 202 for further monitoring; if the hybrid vehicle has entered a steep grade environment—as is the case with first road segment 320—then the method proceeds to the next step.

Assuming that the hybrid vehicle has entered a steep grade environment, step 204 then makes a first set of adjustments to a power management scheme that controls certain aspects of the primary power source and the auxiliary power source. Put a different way, if hybrid vehicle 10 enters a mountainous or other steep grade environment like first road segment 320, the method may want to modify the point at which the auxiliary power source 22 (e.g., engine 60 and generator 62) is turned 'on' and 'off'. By manipulating this aspect of the power management scheme, step 204 can take preventative measures during future declining road segments in order to generate and store additional electrical energy—creating a stored energy buffer of sorts—and thus avoid situations where the hybrid vehicle must slow down or stop in order to charge battery 32. This strategy is somewhat premised on the idea that most steep grade environments are not isolated instances, but rather are part of a mountainous terrain that includes a number of inclines and declines. One way that step 204 may make a first set of adjustments to the power management scheme involves increasing a "target value" for battery 32, which broadly includes any value, limit, threshold and/or range that is related to the point at which auxiliary power source 22 is turned 'on' and/or 'off' or to how the auxiliary power source is operated (e.g., the speed of engine 60). The following example describes a target value in the context of a state-of-charge (SOC), however, other values like voltage levels, states-of-health (SOH), etc. could be used instead.

Under normal driving conditions hybrid vehicle 10 may use a target value for battery 32 that includes an SOC setpoint of about 22.5% and an SOC setpoint window of about 20%-25%, for example. When the measured SOC of battery 32 falls below 20%, auxiliary power source 22 turns 'on' and begins generating electrical energy; this generally continues until the SOC of the battery increases to 25%, at which point the auxiliary power source is turned 'off'. The SOC setpoint of 22.5% generally represents the ideal or target SOC level that hybrid vehicle 10 is trying to achieve. As an example, step 204 could increase this target value to an SOC setpoint of say 45% and an SOC setpoint window of 40%-50%. The target value in this example may include the SOC setpoint, the SOC setpoint window, or both. Hysteresis, vehicle speed, road conditions and/or other factors may also be taken into account when establishing and implementing a target value. Any number of different techniques and methods for establishing and implementing a target value could be used, as method 200 is not limited to any particular embodiment. For instance, the target value adjustment or buffer in step 204 could be related to the difference or delta 324 between the required output power of electric motor 36 (graph 306) and the amount of output power available from auxiliary power source 22 (graph 308), as explained below. Step 204 may use different target value adjustments or buffers based on a lot of different factors, including the steepness or grade of the road.

According to a potential embodiment, step 204 may provide a vehicle user with the option of accepting the increased target value. This option, as well as the corresponding feedback, may be presented to and/or received from the vehicle user via user interface 82. There may be certain circumstances—such as when the vehicle user does not mind driving the hybrid vehicle at reduced speeds or is acutely concerned with the fuel economy of the vehicle—where they do not wish for the auxiliary power source 22 to be operated any more than it has to. In such a case, method 200 could simply proceed to step 206 and use the existing target values for battery 32 without increasing them.

Next, step 206 operates hybrid vehicle 10 according to the newly increased target value. This step is best explained with reference to the exemplary target values from above, in the context of FIG. 3. During the first road segment 320 there is a period of time (sub-segment 322) where the auxiliary power source 22 is unable to meet the electrical energy demands of the vehicle; this is demonstrated by the fact that graph 306 (required output power of electric motor 36) exceeds graph 308 (output power produced by auxiliary power source 22 when engine 60 is operating at a constant 4,200 r.p.m). Accordingly, hybrid vehicle 10 must draw from the energy stored in battery 32 to augment that produced by the auxiliary power source, thus, causing the battery SOC to go down. The difference or delta 324 between these two graphs is related to the SOC that is depleted from battery 32. Once hybrid vehicle 10 reaches the end of first road segment 320, the road begins to decline or go downhill (i.e., a negative grade) which gives the hybrid vehicle an opportunity to generate and store energy on battery 32. The amount of excess energy capacity available is generally related to the difference or delta 330 between graph 308 and 306. Normally, the auxiliary power source 22 would continue to operate until the battery SOC reaches 25% (SOC setpoint window upper limit), at which point it would turn off But because step 204 increased this target value, the auxiliary power source will now operate all the way until the battery SOC reaches 50%. This causes hybrid vehicle 10 to generate, store and maintain a higher level of charge on battery 32 than it normally would and to prepare for the next steep grade environment so that a desired vehicle speed can be maintained. In one sense, method 200 tries to bank electrical energy when it can in order to get through strenuous climbs where it anticipates using lots of electrical energy. It should be appreciated that the hybrid vehicle can store electrical energy on battery 32 whenever the output power produced by auxiliary power source 22 (graph 308) exceeds the output power of electric motor 36 (graph 306), and is not limited to downhill sections of the road having negative grades.

In the preceding example, step 204 modified the target value by increasing or shifting upwards both an SOC setpoint and a corresponding SOC setpoint window, as well as by broadening the SOC setpoint window (increased from an overall range of 5% to one of 10%). It is not necessary for step 204 to perform all of these tasks, as any combination thereof could be used instead (e.g., the SOC setpoint and corresponding SOC setpoint window could be shifted without broadening the window). Other ways of changing, modifying or otherwise manipulating the target value may be used instead. For example, instead of the power management scheme only controlling the point at which the auxiliary power source 22 is turned 'on' and 'off', it is also possible to control other aspects of its operation like the speed of engine 60, etc. Any suitable way of controlling or governing the auxiliary power source while it generates electrical energy may be used. Vehicle testing and/or modeling has shown that by increasing the SOC setpoint by approximately 20% (increasing from 22.5% to 45%), the exemplary hybrid vehicle 10 is able to traverse most mountain highways at posted speeds without a significant reduction in vehicle speed. It is also possible for hybrid vehicle 10 to use other techniques, such as regenerative braking, to charge battery 32 during down slopes and increase the SOC level at an even faster pace.

With additional stored electrical energy, the hybrid vehicle continues until it reaches a second road segment 340 having a steep grade environment. Again, second road segment 340 includes portions where the electric motor output exceeds some threshold (e.g., 40 KW) while the overall vehicle acceleration is only 0.0 m/s². Because hybrid vehicle 10 enters this steep grade environment with an increased amount of stored energy, it is likely that the vehicle will have enough energy to maintain a desired vehicle speed throughout the incline. This is particularly true considering that second road segment 340 is a relatively short section with a grade that does not exceed 4%. Step 206 may continue to operate the hybrid vehicle with an increased target value through a third road segment 350, which is even longer in duration than the first and second road segments. Again, hybrid vehicle 10 enters second road segment 350 with an increased amount of stored electrical energy that should be enough to sustain the vehicle at a desired vehicle speed through this steep grade environment. Saving or buffering additional electrical energy may enable the hybrid vehicle 10 to use a smaller engine 60 (improves fuel economy), yet still be able to get up and down mountain roads at a desired speed. Those skilled in the art will appreciate that auxiliary power source 22 is generally able to provide excess energy for storage on battery 32 anytime that Step 210 may use any variety of different techniques, including those described above, to determine when the hybrid vehicle has exited the steep grade environment or is otherwise in no further need of the increased target value. This step could be performed in a number of different ways. The method may use the elevated target value for a set number of steep grade environments (e.g., if the elevated target value was set during a first road segment 320, then it could simply be used through the next steep grade environment that is encountered (second road segment 340)); the method may use the elevated target value for a set amount of distance or time (e.g., 15 minutes or 10 miles following the point at which it was set); the method may use the elevated target value until one or more conditions are met (e.g., until the hybrid vehicle exits the steep grade environment); or the method may use the elevated target value until the battery is actually recharged to that elevated level (e.g., use the elevated SOC setpoint range of 40%-50% until the battery SOC reaches 50%). These are only some of the possible implementations for step 210, as others are certainly possible. If step 210 determines that hybrid vehicle 10 is still in a steep grade environment or that an elevated target value is warranted, then the method loops back to step 206 for further operation. If, on the other hand, step 210 determines that the hybrid vehicle has exited the steep grade environment or that an elevated target value is no longer needed, then the method proceeds to step 214.

Step 214 decreases the target value of the battery, and may do so according to a number of different embodiments. For instance, step 214 may reset the target value to its original level, it may reduce the target value to some amount other than its original level, or it may make other adjustments or manipulations. Increases and/or decreases in the target value (steps 204 and/or 214) may be done suddenly and in one step, or they may be done gradually in a sequence of smaller steps. For instance, step 204 and/or 214 may adjust or change the target value in 5% or 10% SOC intervals.

The target values discussed above are generally part of a larger power management scheme that is used by the hybrid vehicle to manage or otherwise control certain aspects of the primary and auxiliary power sources, but they are not the only components of the power management scheme. Controlling the generation, storage and/or usage of electrical energy—whether it be by components of primary power source 20, auxiliary power source 22 and/or some other part of hybrid vehicle 10—may be included within the power management scheme. Generally speaking, the power management scheme may be implemented through electronic algorithms that are saved and executed by control system 24 or some other suitable component, device, module, system, etc. Another potential aspect of the power management scheme involves what to do if battery 32 ever gets too low. For example, it is possible for hybrid vehicle 10 to have an absolute lower SOC threshold (e.g., 15%) and an absolute upper SOC threshold (e.g., 90%), such that measures can be taken to ensure that the SOC of the battery does not go beyond these boundaries. This could involve limiting the speed of the vehicle, as well as disabling certain components as well as the vehicle itself. There are a number of embodiments for implementing these and other aspects of the power management scheme, any number of which may be used here.

It is to be understood that the foregoing description is not a definition of the invention, but is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, the specific combination and order of steps illustrated in FIG. 2 is just one possibility, as the present method may include a combination of steps that has fewer, greater or different steps than that shown here. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A method for operating a hybrid vehicle having a primary power source and an auxiliary power source, comprising the steps of:
  (a) monitoring at least one primary power source parameter that relates to an electric motor or a battery of the primary power source and at least one vehicle performance parameter that relates to the performance of the hybrid vehicle and, based at least partially on a comparison of the primary power source parameter to the vehicle performance parameter, determining if the hybrid vehicle enters a steep grade environment where an average grade is steep enough to warrant a specific power management scheme for the hybrid vehicle;
  (b) making a first set of adjustments to the power management scheme that controls one or more aspects of the primary power source and/or the auxiliary power source at least partially in response to the hybrid vehicle entering the steep grade environment, and the first set of adjustments is based on an anticipated future need for electrical energy by the hybrid vehicle in the steep grade environment; and
  (c) operating the hybrid vehicle according to the power management scheme with the first set of adjustments.

2. The method of claim 1, wherein step (a) further comprises monitoring at least one primary power source parameter that is selected from the group consisting of: a speed, torque or output power of the electric motor or a downstream component, or a battery condition.

3. The method of claim 1, wherein step (a) further comprises monitoring at least one vehicle performance parameter that is selected from the group consisting of: a vehicle position, velocity or acceleration; and using the primary power source parameter and the vehicle performance parameter to determine if the hybrid vehicle enters the steep grade environment.

4. The method of claim 1, wherein step (a) further comprises monitoring an electric motor output and a vehicle acceleration; and comparing the electric motor output to a minimum threshold and comparing the vehicle acceleration to a maximum threshold, if the electric motor output is greater than the minimum threshold and the vehicle acceleration is less than the maximum threshold then determining that the hybrid vehicle has entered the steep grade environment.

5. The method of claim 1, wherein step (b) further comprises making a first set of adjustments to the power management scheme at least partially in response to the hybrid vehicle entering the steep grade environment, and the first set of adjustments includes increasing a target value for a battery that is part of the primary power source.

6. The method of claim 5, wherein the target value for the battery includes at least one value that is related to the point at which the auxiliary power source is turned 'on' and/or 'off' and is selected from the group consisting of: a state-of-charge (SOC) setpoint, a state-of-charge (SOC) setpoint window, or a range for the state-of-charge (SOC) setpoint window.

7. The method of claim 5, wherein the increased target value for the battery causes the auxiliary power source to charge the battery to a state-of-charge (SOC) level that is higher than that experienced during normal vehicle operation.

8. The method of claim 5, wherein the increased target value for the battery is related to the difference between a required output power of the primary power source and an amount of output power available from the auxiliary power source.

9. The method of claim 5, wherein the increased target value is at least 20%.

10. The method of claim 5, wherein step (b) further comprises presenting a vehicle user with the option of accepting the increase to the target value of the battery before making the first set of adjustments to the power management scheme.

11. A method for operating a hybrid vehicle having a primary power source and an auxiliary power source, comprising the steps of:
(a) monitoring at least one primary power source parameter that relates to an electric motor or a battery of the primary power source and at least one vehicle performance parameter that relates to the performance of the hybrid vehicle and, based at least partially on a comparison of the primary power source parameter to the vehicle performance parameter, determining if the hybrid vehicle enters a steep grade environment;
(b) increasing a target value for a battery that is part of the primary power source at least partially in response to the hybrid vehicle entering the steep grade environment, and the increased target value is a precautionary measure that enables the battery to store a higher level of charge when the hybrid vehicle is in the steep grade environment; and
(c) using the auxiliary power source to charge the battery to the increased target value so that a higher level of charge is stored on the battery when the hybrid vehicle is in the steep grade environment.

12. The method of claim 11, wherein step (a) further comprises monitoring an electric motor output and a vehicle acceleration; and comparing the electric motor output to a minimum threshold and comparing the vehicle acceleration to a maximum threshold, if the electric motor output is greater than the minimum threshold and the vehicle acceleration is less than the maximum threshold then determining that the hybrid vehicle has entered the steep grade environment.

13. The method of claim 11, wherein the target value for the battery includes at least one value that is related to the point at which the auxiliary power source is turned 'on' and/or 'off' and is selected from the group consisting of: a state-of-charge (SOC) setpoint, a state-of-charge (SOC) setpoint window, or a range for the state-of-charge (SOC) setpoint window.

14. The method of claim 11, wherein the increased target value for the battery causes the auxiliary power source to charge the battery to a state-of-charge (SOC) level that is higher than that experienced during normal vehicle operation.

15. The method of claim 11, wherein the increased target value for the battery is related to the difference between a required output power of the primary power source and an amount of output power available from the auxiliary power source.

16. The method of claim 11, wherein the increased target value is at least 20%.

17. The method of claim 11, wherein step (b) further comprises presenting a vehicle user with the option of accepting the increase to the target value of the battery before making a first set of adjustments to a power management scheme.

* * * * *